United States Patent
Kang

(10) Patent No.: US 10,270,617 B2
(45) Date of Patent: Apr. 23, 2019

(54) METHOD AND APPARATUS FOR HIGH SPEED EQUALIZATION OF DATA PACKET RECEIVED FROM BUS TOPOLOGY NETWORK

(71) Applicant: Suwon Kang, Gyeonggi-do (KR)

(72) Inventor: Suwon Kang, Guri-si (KR)

(73) Assignee: VSI CORPORATION, Seoul (KR)

( * ) Notice: Subject to any disclaimer, the term of this patent is extended or adjusted under 35 U.S.C. 154(b) by 0 days.

(21) Appl. No.: 15/540,448

(22) PCT Filed: Dec. 11, 2015

(86) PCT No.: PCT/KR2015/013549
§ 371 (c)(1),
(2) Date: Jun. 28, 2017

(87) PCT Pub. No.: WO2016/108467
PCT Pub. Date: Jul. 7, 2016

(65) Prior Publication Data
US 2018/0013577 A1    Jan. 11, 2018

(30) Foreign Application Priority Data
Dec. 30, 2014  (KR) .......................... 10-2014-0193342

(51) Int. Cl.
*H04L 12/40*   (2006.01)
*H04L 25/03*   (2006.01)

(52) U.S. Cl.
CPC ........ *H04L 12/40* (2013.01); *H04L 25/03019* (2013.01); *H04L 25/03267* (2013.01)

(58) Field of Classification Search
CPC .............. H04L 12/40; H04L 25/03019; H04L 25/03267
See application file for complete search history.

(56) References Cited

U.S. PATENT DOCUMENTS 3,764,914 A * 10/1973 Karnaugh ......... H04L 25/03076
                                                    333/166
4,027,258 A *  5/1977 Perreault .......... H04L 25/03038
                                                    333/166
(Continued)

FOREIGN PATENT DOCUMENTS

EP          0169548 A2     1/1986
EP          0180066 A2     5/1986
(Continued)

OTHER PUBLICATIONS

International Search Report for PCT/KR2015/013549 dated Apr. 25, 2016 from Korean Intellectual Property Office.
(Continued)

*Primary Examiner* — Jean B Corrielus
(74) *Attorney, Agent, or Firm* — Paratus Law Group, PLLC

(57) ABSTRACT

A method of equalizing received packet data in a bus topology network, including: receiving, by a receiver of a second node, a first packet from a first node in a bus topology network in which two or more nodes are connected via a bus; setting, by the receiver, an equalizer coefficient of an equalizer using a first training sequence of the first packet and storing the set equalizer coefficient; receiving, by the receiver, a second packet including a second training sequence shorter than the first training sequence from the first node; and equalizing, by the receiver, the second packet using the stored equalizer coefficient.

6 Claims, 9 Drawing Sheets

(56) References Cited

U.S. PATENT DOCUMENTS

| | | | |
|---|---|---|---|
| 4,621,366 A | 11/1986 | Cain et al. | |
| 6,862,315 B1* | 3/2005 | Garg | H04L 25/03133 |
| | | | 375/232 |
| 8,290,033 B2 | 10/2012 | Garg et al. | |
| 2004/0101075 A1* | 5/2004 | Kim | H04N 5/211 |
| | | | 375/350 |
| 2007/0098060 A1* | 5/2007 | Tanaka | H04B 17/0085 |
| | | | 375/224 |
| 2007/0104252 A1* | 5/2007 | Jang | H04B 1/7075 |
| | | | 375/147 |
| 2007/0147489 A1 | 6/2007 | Sun et al. | |
| 2009/0016423 A1* | 1/2009 | Semjonov | H04L 1/0061 |
| | | | 375/233 |
| 2009/0190686 A1* | 7/2009 | Cheong | H04B 7/0413 |
| | | | 375/267 |
| 2010/0158530 A1* | 6/2010 | Soto | H04B 10/40 |
| | | | 398/79 |
| 2014/0079145 A1* | 3/2014 | Sampath | H04B 7/0811 |
| | | | 375/260 |
| 2016/0088126 A1* | 3/2016 | Doan | H04L 69/22 |
| | | | 370/329 |

FOREIGN PATENT DOCUMENTS

| | | |
|---|---|---|
| JP | 11-205198 A | 7/1999 |
| JP | 2001-044894 A | 2/2001 |
| JP | 2012-114712 A | 6/2012 |

OTHER PUBLICATIONS

European Search Report for EP 15 875 561.1 dated Aug. 22, 2018 from European Patent Office.

* cited by examiner

FIG. 3

| P1 | PREAMBLE | PACKET TYPE=0 | TRAINING SEQUENCE | |
|---|---|---|---|---|

| P3 | PREAMBLE | PACKET TYPE=1 | TRAINING SEQUENCE | DATA |
|---|---|---|---|---|

| P2 | PREAMBLE | PACKET TYPE=0 | TRAINING SEQUENCE | DATA |
|---|---|---|---|---|

| P4 | PREAMBLE | PACKET TYPE=1 | TRAINING SEQUENCE | DATA |
|---|---|---|---|---|

METHOD AND APPARATUS FOR HIGH SPEED EQUALIZATION OF DATA PACKET RECEIVED FROM BUS TOPOLOGY NETWORK

CROSS REFERENCE TO PRIOR APPLICATIONS

This application is a National Stage Patent Application of PCT International Patent Application No. PCT/KR2015/013549 (filed on Dec. 11, 2015) under 35 U.S.C. § 371, which claims priority to Korean Patent Application No. 10-2014-0193342 (filed on Dec. 30, 2014), which are all hereby incorporated by reference in their entirety.

TECHNICAL FIELD

The present invention relates to a method of transmitting and receiving packet data in a bus topology network and a method of equalizing a received packet.

BACKGROUND ART

Ethernet is a representative standard of wired bus topology packet networks. Ethernet based on up to 10 Mbps uses a bus topology network. However, when a data rate exceeds 100 Mbps, channel distortion becomes severe, and it is not possible to perform high-speed communication without using an equalizer.

In a bus topology network, a plurality of receivers should be able to receive a packet transmitted by a transmitter. However, since it is not possible to know in advance to which receiver the transmitter transmits a packet, equalizer training is difficult. Therefore, a network of 100 Mbps or more uses a star topology network (star network). Since all Ethernet nodes in a star network communicate with other network nodes through a switch, when a node transmits data, the corresponding receivers are unified as a receiver in the switch, and only an equalizer for a single transceiver link is required. Therefore, it is possible to previously perform equalizer training for a channel between the node and the switch, and high-speed data transmission can be performed on the basis of the equalizer training.

DISCLOSURE

Technical Problem

Although a star network is used to transmit a large amount of data, the star network has a disadvantage in that a large number of switches and cables are required. For example, in systems such as cars, a bus topology network is usually used due to limited space and the weight of cables.

The present invention is directed to providing a packet transmission method which facilitates equalization of a receiver, a receiver including the corresponding equalizer, and a network system in a transceiver system on the basis of a bus topology network.

Technical Solution

One aspect of the present invention provides a method of equalizing packet data at high speed, the method including: receiving, by a receiver of a second node, a first packet from a first node in a bus including the first node and the second node; setting, by the receiver, an equalizer coefficient of an equalizer using a first training sequence of the first packet and storing the set equalizer coefficient; receiving, by the receiver, a second packet including a second training sequence shorter than the first training sequence from the first node; and equalizing, by the receiver, the second packet using the stored equalizer coefficient.

The equalizing of the second packet may include: determining, by the receiver, at least one of a sampling phase difference and a carrier wave phase difference between the first training sequence and the second training sequence and correcting an input signal of the equalizer based on the determined at least one of the sampling phase difference and the carrier wave phase difference; and equalizing, by the equalizer to which the equalizer coefficient has been applied, the corrected input signal.

Another aspect of the present invention provides a method of receiving packet data, the method including: receiving, by a receiver of a receiving node connected via a bus topology network, a packet from a transmitting node; determining, by the receiver, whether equalizer training has been previously performed with a training packet previously transmitted by the transmitting node based on an identifier included in the packet; when the equalizer training for the transmitting node has been performed, loading, by the receiver, an equalizer coefficient for the transmitting node to set an equalizer of the receiver; and equalizing, by the receiver, the packet using the equalizer having the equalizer coefficient.

The method may further include, when the equalizer training has been performed for the transmitting node, correcting, by the receiver, at least one of a sampling phase difference and a carrier wave phase difference which occurs when the equalizer equalizes the packet with the equalizer coefficient using the packet having a training sequence shorter than a training sequence included in the training packet.

Another aspect of the present invention provides a receiver of a bus topology network, the receiver including: a coefficient extraction device configured to store an equalizer coefficient for at least one transmitting node and extract an equalizer coefficient according to a source node of a received packet; a sampling device configured to sample a baseband signal in every symbol period; and an equalizer configured to equalize an output signal of the sampling device using the stored equalizer coefficient when the baseband signal is a signal received from the transmitting node.

The receiver of the bus topology network may further include a phase corrector configured to correct a sampling phase difference and a carrier wave phase difference between an output of the equalizer and a training sequence included in the baseband signal for the output signal using the training sequence.

The phase corrector may determine an optimal sampling phase difference and an optimal carrier wave phase difference for minimizing an error of the output of the equalizer among a plurality of quantized candidate sampling phase differences and carrier wave phase differences, firstly correct an input signal based on the determined optimal sampling phase difference and the optimal carrier wave phase difference, determine a carrier wave phase difference value for minimizing an error between the output of the equalizer and each training symbol per training symbol, determine a final optimal carrier wave phase difference by adding an average of carrier wave phase differences determined for all symbols to a determined optimal carrier wave phase differences, and secondarily correct a phase of the corrected input signal based on the final optimal carrier wave phase difference.

Another aspect of the present invention provides a method of transmitting packet data, the method including: (a) transmitting, by a transmitter of a first node connected to a bus, a first packet in a first format to a second node connected to the bus; (b) transmitting, by the transmitter, a second packet in the first format to a third node connected to the bus after step (a); (c) transmitting, by the transmitter, a third packet in a second format to the second node after step (a); and (d) transmitting, by the transmitter, a fourth packet in the second format to the third node after step (b). The first format includes a field of a first training sequence, and the second format includes a field of a second training sequence shorter than the first training sequence.

The receiving nodes may set equalizer coefficients of the receiving nodes using the packets in the first format, and when the packets in the second format are received, the receiving nodes may correct at least one of sampling phase differences and carrier wave phase differences between the packets in the first format and the packets in the second format and equalize the packets in the second format using equalizers having the set equalizer coefficients.

Advantageous Effects

Technology described below makes it possible to relatively simply configure a network using a bus topology network. Further, according to the technology described below, a receiver identifies a transmitting node which has transmitted a packet, and every time a packet is received, an equalizer is not trained again from the beginning but rapidly equalizes the received packet using a previous equalizer setting. Such a high-speed equalization technique reduces data overhead required for equalizer training and maximizes the throughput of a system. Consequently, the technology described below enables high-speed packet data communication on the basis of a bus topology network.

DESCRIPTION OF DRAWINGS

FIG. 3 is an example showing fields of packets used in FIG. 2.

MODES OF THE INVENTION

Figure 1:
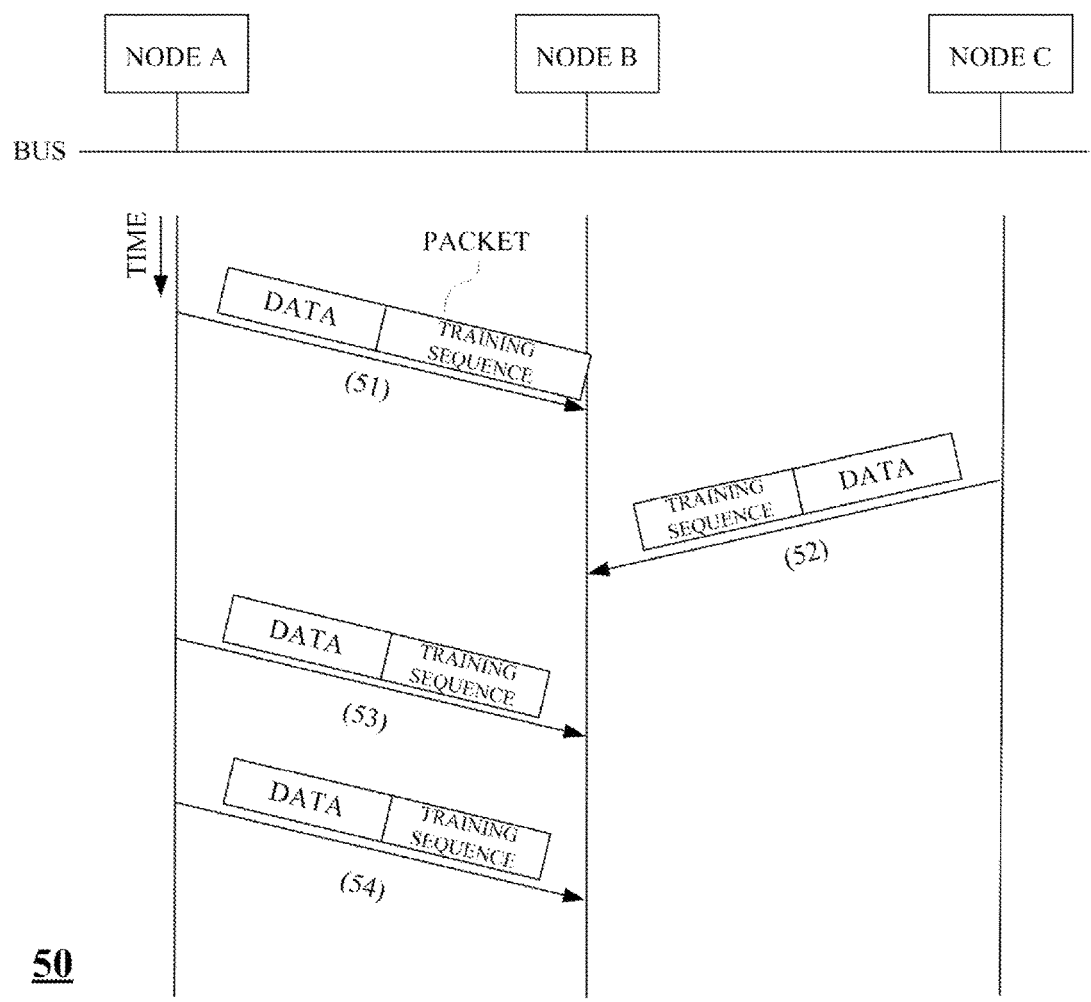
FIG. 1 is an example showing a process of generally transferring packets in a bus topology network.

The technology described below may be variously modified and may have various exemplary embodiments, and specific exemplary embodiments will be shown as examples in the drawings and described in detail. However, it is noted that the technology described below is not limited to the specific exemplary embodiments but includes all possible modifications, equivalents and replacements which fall within the spirit and scope of the technology described below.

The terms, such as first, second, A, B, etc., may be used in describing various components, but the components are not limited by the terms. The terms are used only to distinguish one component from other components. For example, a first component may be named a second component, and a second component may be named a first component in a similar way without departing from the scope of the technology described below. The term "and/or" includes a combination or any of a plurality of associated listed items.

A singular expression includes a plural expression unless it is clearly construed in a different way in the context. The terms used herein, such as "including" and the like are used only to designate the features, numbers, steps, operations, components, parts, or combinations thereof described in the specification, but should be construed not to exclude presence or addition of one or more other features, numbers, steps, operations, components, parts, or combinations thereof.

Prior to describing drawings in detail, a division of the configuration units in the present specification is only by the main function of each configuration unit. In other words, two or more of the configuration units to be described below may be combined into a single configuration unit, or one configuration unit may be divided into two or more units according to subdivided functions. Each of the configuration units to be described below may additionally perform a part or all of the functions among functions set for other configuration units other than being responsible for the main function, and some of main functions taken by each of the configuration units may be exclusively taken and performed by other configuration units. Therefore, the presence of the configuration units each described through the present specification should be functionally interpreted. For this reason, it is clearly noted that the configurations of configuration units of a receiver 300 and an equalizer 400 of a bus topology network according to the technology described below can differ from the corresponding drawing within the limits of achieving the purpose of the technology described below.

When a method or an operating method is performed, steps of the method may be performed in a different order from a described order unless a specific order is clearly mentioned in the context. In other words, steps may be performed in the same order as described, performed substantially simultaneously, or performed in reverse order.

Hereinafter, a method of transmitting a packet in a bus topology network, a method of receiving a packet in a bus topology network, a method of equalizing a packet at high speed in a bus topology network, a receiver in a bus topology network and an equalizer of a bus topology network receiver will be described in detail with reference to the drawings.

FIG. 1 is an example showing a process 50 of generally transferring packets in a bus topology network. In FIG. 1, it is assumed that a node A, a node B and a node C are connected via a bus and packets are transmitted by the nodes at different times. FIG. 1 shows a case in which the node A and the node C transmit packets to the node B.

In FIG. 1, each node transmits a packet including a training sequence and data. A packet transmitted by a transmitting node is generally subjected to inter-symbol interference while passing through a channel. Therefore, a receiving node compensates for distortion caused by the inter-symbol interference using an equalizer of a receiver. In the following description, it is assumed that an equalizer is configured with a feed-forward equalizer (FFE) which is a linear equalizer and a feedback equalizer (FBE) which is a non-linear decision-feedback equalizer.

When complete information of a channel in which inter-symbol interference occurs is obtained, it is possible to calculate an equalizer coefficient which corresponds to an inverse of the channel on the basis of the information. However, in general, since a receiver does not have information of a channel, a transmitter of a transmitting node initially transmits a training sequence that the receiver knows, and the receiver trains an equalizer using the received training sequence and determines an equalizer coefficient.

An equalizer performs equalizer training using a training sequence of a received packet to compensate for inter-symbol interference. The equalizer determines an FFE coefficient and an FBE coefficient through the equalizer training and is set with the equalizer coefficients. Subsequently, the equalizer equalizes data included in the packet using the set equalizer coefficient. An output of the equalizer which has been compensated for channel distortion is determined to be a value obtained by adding an output of an FFE and a negative value of an output of an FBE.

Even if there is no specific description below, it is assumed that a process performed by a transmitting node is a process performed by a transmitter of the transmitting node and a process performed by a receiving node is a process performed by a receiver of the receiving node.

In FIG. 1, first, the node A transmits a packet to the node B (51). The packet transmitted by the node A has a training sequence in a forepart thereof and data behind the training sequence. A receiver of the node B trains an equalizer using the training sequence, compensates for inter-symbol interference of the following data using the trained equalizer, and receives the data.

Subsequently, the node C transmits a packet to the node B (52). The packet transmitted by the node C also has a training sequence and data. Since different transmitting nodes have different characteristics of wired channels in which packets are transmitted, the node B should perform equalizer training again in the receiver. Therefore, the node B discards the equalizer coefficient optimized for a node A-node B link and performs training for a node C-node B link.

Subsequently, the node A transmits a packet to the node B (53). Since the node B has just set the equalizer using the training sequence of the packet transmitted by the node C (52), the node B should train the equalizer again using a training sequence transmitted by the node A.

Subsequently, the node A transmits another packet to the node B again (54). The node B has just received the packet from the node A but should train the equalizer again using a training sequence included in the other packet. This is because the node B, which is the receiving node, does not know which node is currently transmitting the other packet. Further, even when the node B knows that the same node is transmitting the other packet, the equalizer of the node B loses time and phase synchronization during a period in which there is no data exchange after transmission of the last packet, and thus the node B should perform equalizer training again. In this way, a training sequence for training an equalizer is transmitted in each packet in a conventional bus topology network, and a receiver can receive the data after training the equalizer using the training sequence. As described above, in the bus topology network of FIG. 1, since a training sequence required for equalizer training should be carried every time a packet is transmitted, data transceiving efficiency notably deteriorates. Further, a technique such as least mean square (LMS) is widely used as a training method for an equalizer coefficient, but the LMS technique requires a long time to train for an equalizer coefficient. Therefore, time overhead for a receiver to perform equalizer training using a training sequence may remarkably increase.

Figure 2:
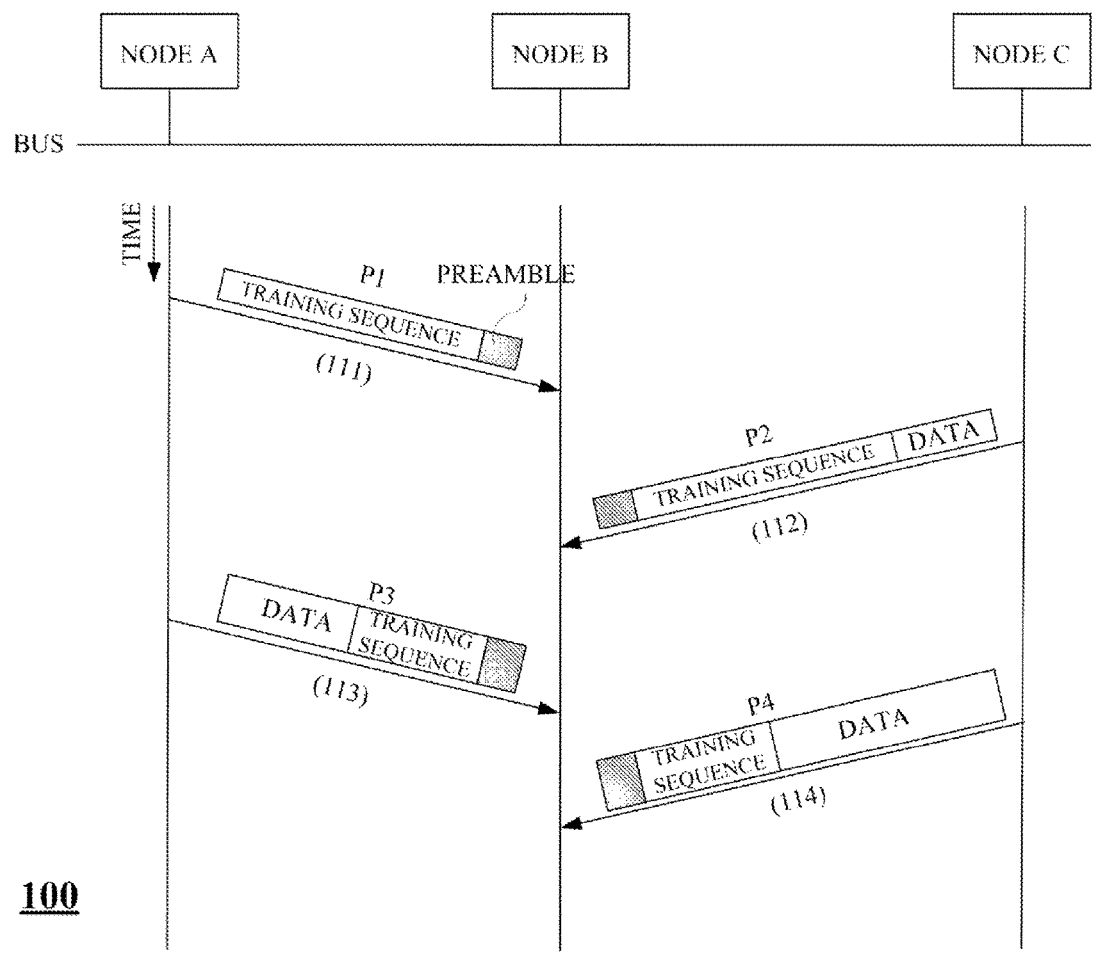
FIG. 2 is an example showing a process of transferring packets using high-speed equalization in a bus topology network.

FIG. 2 is an example showing a process 100 of transferring packets using high-speed equalization in the same bus topology network as in FIG. 1. FIG. 2 illustrates a case in which there are three nodes as an example, but it can be easily seen that the process 100 can be also applied to an arbitrary network in which two or more nodes are connected. Packets of FIG. 2 transmitted by nodes have different structures than packets of FIG. 1. First, structures of the packets transmitted by nodes in FIG. 2 will be described. FIG. 3 is an example showing fields of the packets used in FIG. 2. In FIG. 2, a node A transmits a packet P1 and a packet P3 to a node B, and a node C transmits a packet P2 and a packet P4.

All the packets include a preamble field and a packet type field in common. Also, all the packets include a training sequence field in common which varies in length according to packet types. The packets may include a data field or may not. Since a data packet is a packet for transmitting data, the data packet necessarily includes a data field, which will be described below.

A preamble field includes an identity (ID) of a transmitting node which transmits the corresponding packet and an ID of a receiving node which receives the packet. Packet types include a training packet (whose packet type value is shown to be "0" in FIG. 3) and a data packet (whose packet type value is shown to be "1" in FIG. 3).

A training packet is a packet for training an equalizer of a receiving node. A receiver of the receiving node trains the equalizer using a training sequence included in the training packet. The training sequence included in the training packet is referred to as a first training sequence. The receiving node determines equalizer coefficients using first training sequences and stores the determined equalizer coefficients according to transmitting nodes.

A data packet is a packet for transferring data to a receiving node. A data packet also includes a training sequence, but the training sequence is shorter than a first training sequence of a training packet. The training sequence included in the data packet is referred to as a second training sequence. The receiving node performs high-speed equalization using the second training sequence. A detailed process of high-speed equalization will be described below.

Packet transmission of FIG. 2 will be described according to time flow. In FIG. 2, the node A transmits the packet P1 to the node B (111). The packet P1 corresponds to a training packet. The node B identifies whether the packet P1 is a training packet through a packet type and determines an equalizer coefficient using a training sequence (a first training sequence) included in the training packet. When equalizer training is successfully finished, the node B stores the equalizer coefficient for the node A which is a transmitting node in a predetermined storage device in a receiver and notifies the node A which is the transmitting node that an equalizer has converged.

Subsequently, the node C transmits the packet P2 which is a training packet to the node B (112). The node B determines that the received packet P2 is a training packet and trains the equalizer using a training sequence (a first training sequence) included in P2. When equalizer training is successfully finished, the node B stores an equalizer coefficient for the node C which is a transmitting node in a predetermined storage device in the receiver and notifies the node C which is the transmitting node that the equalizer has converged.

Although not shown in FIG. 2, when equalizer training has not been appropriately performed, the node B which is the receiving node may request a transmitting node to transmit a training packet again.

As shown in FIGS. 2 and 3, the training packet P2 transmitted by the node C includes a data field. According to how a protocol corresponding to communication rules and regulations is defined, a data field may be included in a training packet. The node B may train the equalizer using the training sequence included in the training packet P2, set an equalizer coefficient, and then continuously receive data included in P2.

Subsequently, the node A transmits the packet P3 which is a data packet to the node B again (113). The node B determines that P3 is a data packet on the basis of packet type information. Subsequently, the node B loads the equalizer coefficient for the node A from the internal storage device to set the equalizer, rapidly makes an equalizer setting using a second training sequence, and then receives data in P3.

When there is not a change, such as an addition of a new node or a removal of a node, in a bus and a physical state of the bus is not changed, an inter-symbol interference characteristic of a wired channel will not be changed. Therefore, it can be seen that the equalizer coefficient for which training has been performed using the packet P1 will be similar to an equalizer coefficient appropriate for receiving the packet P3 in the same node A-node B link. However, a point in time at which the node B receives the packet P1 and a point in time at which the node B receives the packet P3 are different, and a phase of a demodulating carrier wave may be changed. Therefore, it is preferable for the node B which is the receiving node to make a predetermined modification to the setting of the receiver. When receiving the packet P3, the receiver samples the signal at predetermined time intervals and transfers the sampled signal to the equalizer. Here, since a phase at which sampling is performed is not the same as a phase at which the packet P1 is received, a difference between reception times of the two packets is expressed as a sampling phase difference. To compensate for such a sampling phase difference and a carrier wave phase difference, a data packet requires a predetermined training sequence. The receiver makes a setting for reusing a previous equalizer coefficient using the training sequence. The present technology describes a case in which a sampling phase difference and a carrier wave phase difference are corrected at a front end of an equalizer, but those of ordinary skill in the art can easily understand that the same effect can be obtained by making a modification equivalent to such phase corrections to a part of a receiver, for example, an equalizer coefficient. A training sequence included in a data packet (a second training sequence) may be configured to be much shorter than a training sequence included in a training packet (a first training sequence). According to required performance of a system, a length of a second training sequence may be set to be one several tenth or one several hundredth the length of a first training sequence. As a result, it is possible to improve the throughput of a system by reducing the number of training sequences and extending a data section in a data packet.

Finally, the node C transmits the packet P4 which is a data packet to the node B (114). The node B loads the equalizer coefficient for the node C and corrects a sampling phase difference and a carrier wave phase difference to perform high-speed equalization on the packet P4.

Operation of a transmitting node is additionally described. A transmitting node should manage information on an equalizer training state of a receiving node to which a generated packet will be transmitted. In FIG. 2, when an equalizer coefficient is successfully determined using the first training sequence of the training packet P1, the node B notifies the node A which is the transmitting node that an equalizer coefficient has been determined. The node A stores information on the state in which an equalizer coefficient has been determined (equalization training has been performed normally) in the node B.

Subsequently, when the node A transmits a packet to the node B again, the node A confirms that equalization training has been completed in the node B using the equalizer training state information thereof. Subsequently, the node A configures a data packet rather than a training packet and transmits data. When the node A transmits data to a fourth node in which an equalizer has not been set, the node A should previously set the equalizer in a receiver of the corresponding node by transmitting a training packet to the node. After the corresponding node notifies the node A that an equalizer setting has been completed, the node A transmits a data packet to the corresponding node.

Figure 4:
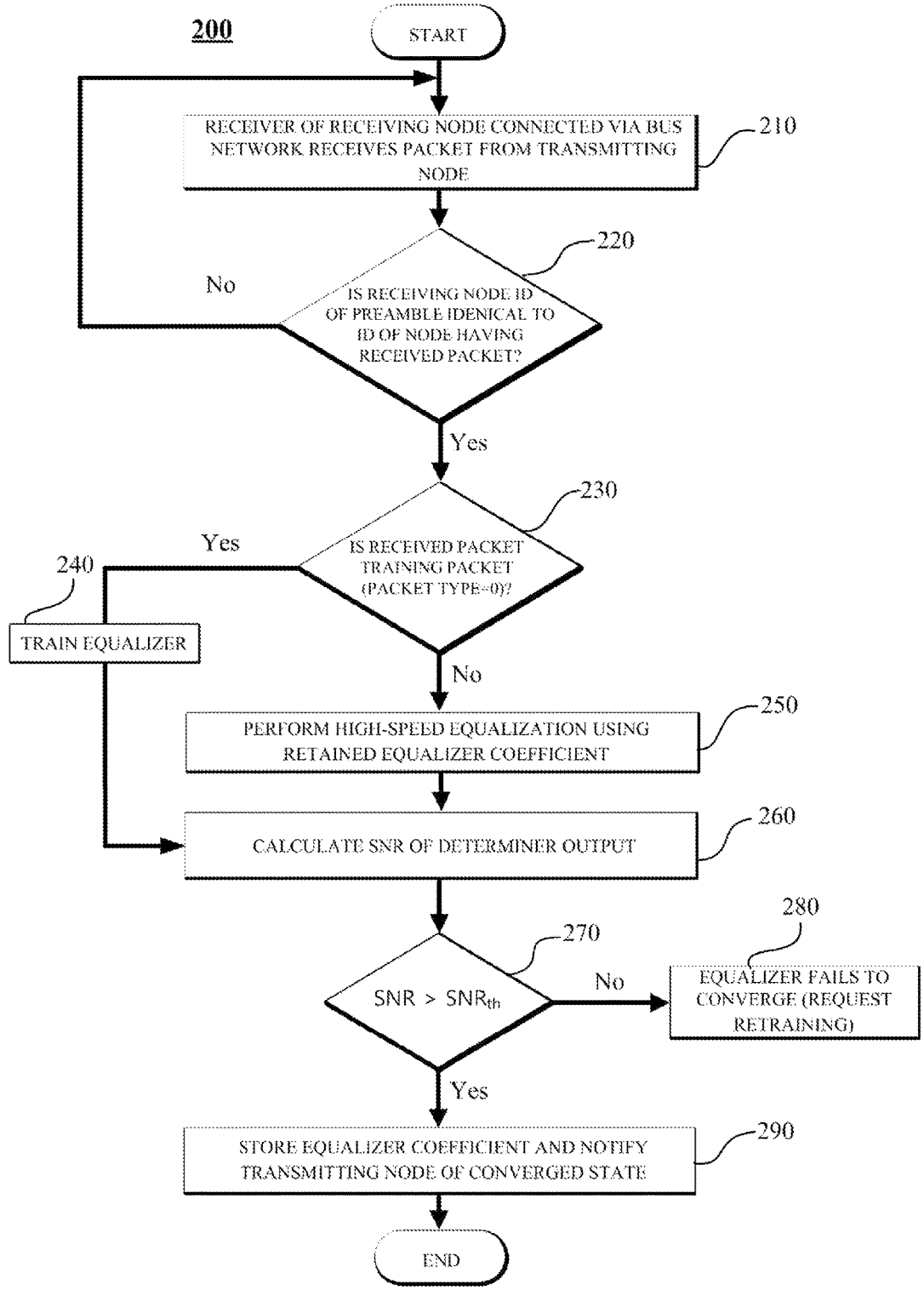
FIG. 4 is an example of a flowchart of a method of receiving a packet in a bus topology network.

FIG. 4 is an example of a flowchart of a method 200 of receiving a packet in a bus topology network.

In the method 200 of receiving a packet in a bus topology network, it is assumed that a transmitting node has transmitted a predetermined packet. As described above, the packet which has been transmitted by the transmitting node includes a preamble field, a packet type field, and a training sequence field.

The preamble field includes a start signal, a transmitting node ID, and a receiving node ID of the packet. The transmitting node ID and the receiving node ID may be generally indicated as a combination of 0 and 1. For example, the node A may be indicated by 0101, and the node B may be indicated by 1010.

First, a receiving node receives the packet transmitted by the transmitting node (210). Actually, in a bus topology network, a packet transmitted by a specific transmitting node can be transferred to all receiving nodes connected via a bus.

The receiving node which receives the packet checks the receiving node ID of a preamble to determine whether the packet is intended to be transferred to the receiving node (220). For example, when the receiving node is the node A (0101) and the receiving node ID included in the preamble is "1010," the node A does not process and ignores the received packet (No of step 220). When the receiving node is the node B (1010) and the receiving node ID included in the preamble is "1010," the node B determines that a destination of the currently received packet is the node B and processes the received packet (Yes of step 220).

Subsequently, the receiving node checks the packet type field of the packet to determine a packet type (230). For consistency with FIGS. 2 and 3, a training packet is assumed to have a packet type of 0. When the packet type of the currently received packet is a training packet (Yes of step 230), the receiving node performs general equalizer training using a first training sequence included in the packet (240). When data follows the first training sequence like in P3 of FIG. 3, the receiving node receives the data using an equalizer setting for which training has been performed.

When the packet type of the received packet is not a training packet but a data packet (No of step 230), the receiving node loads an equalizer coefficient for the corresponding transmitting node on the basis of the transmitting node ID. Subsequently, the receiving node equalizes the received packet at high speed using the loaded equalizer coefficient (250). While the packet is received, the coefficient of an equalizer may be updated in a decision-feedback manner, which is intended for the equalizer to track a very slow change in channel.

After performing equalization, the receiving node calculates a signal-to-noise ratio (SNR) of an output of the equalizer (260). Even after the general equalizer training with the training packet (240) is finished, the receiving node calculates an SNR of an output of the equalizer.

It is determined whether the SNR value is greater than a reference value $SNR_{th}$ (270). When the SNR value is greater than the reference value $SNR_{th}$, the receiving node determines that the equalizer has converged, stores the updated equalizer coefficient in an internal memory, and notifies the transmitting node of a converged state of the equalizer (290). During this process, the receiving node may separately store the calculated SNR value and transfer the calculated SNR value to the transmitting node.

When the SNR is smaller than $SNR_{th}$, the receiving node determines that the equalizer has not converged (has diverged), discards the current equalizer coefficient, and requests equalizer retraining from the transmitting node (280). In this case, the transmitting node transmits a training packet again, and transmits a data packet again after the receiving node finishes equalizer training normally.

$SNR_{th}$ is the reference value for determining whether an equalizer has appropriately converged. As $SNR_{th}$, different values may be used according to a modulation technique, performance of a bus topology network, a communication environment, and the like.

Figure 5:
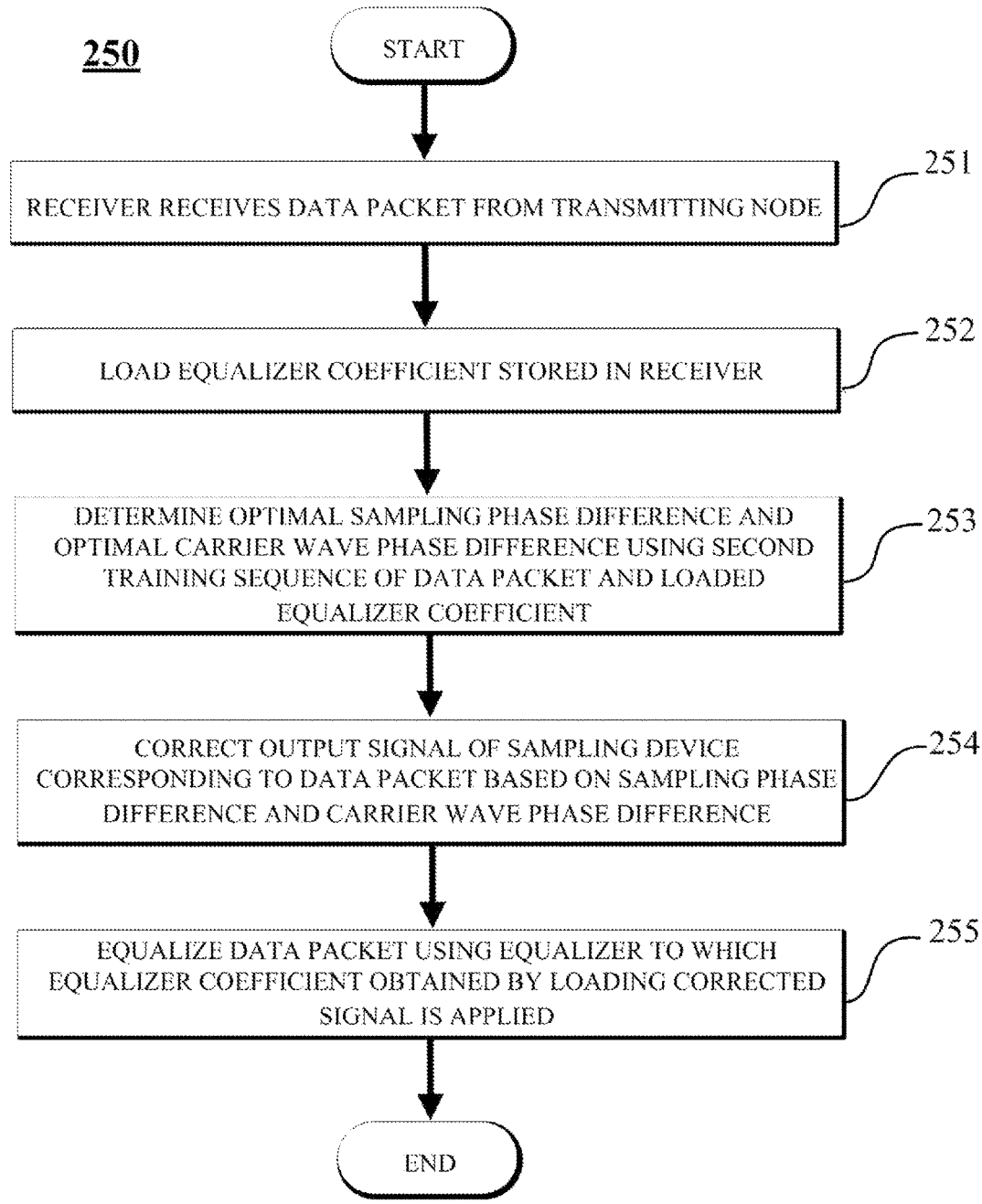
FIG. 5 is an example of a flowchart of a method of equalizing a received packet at high speed in a bus topology network.

The process in which the receiving node performs high-speed equalization (250) in FIG. 4 will be described in detail below. FIG. 5 is an example of a flowchart of a method 250 of equalizing a received packet at high speed in a bus topology network.

The receiving node is retaining an equalizer coefficient for a specific transmitting node through equalizer training which has been previously performed for the specific transmitting node. This process is performed through step 240 of FIG. 4.

Since a sampling phase or a carrier wave phase of a receiver may vary between a point in time at which the receiving node receives a training packet from the transmitting node and a point in time at which the receiving node receives a data packet from the transmitting node, it is necessary to correct the difference.

The receiver receives a data packet transmitted from the transmitting node (251). The receiver loads an equalizer coefficient corresponding to a transmitting node ID included in the packet among stored equalizer coefficients (252).

The receiver calculates an optimal sampling phase difference and carrier wave phase difference using a training sequence (a second training sequence) included in the data packet and the loaded equalizer coefficient and makes a necessary correction. Specifically, the receiver determines an optimal sampling phase difference and carrier wave phase difference using the second training sequence (253) and corrects an output signal of a sampling device of the receiver on the basis of the determined optimal sampling phase difference and carrier wave phase difference (254). Subsequently, the receiver equalizes the packet using the corrected signal as an input of the equalizer (255). The equalization process will be described in further detail below with reference to the equalizer 400 of FIG. 8.

Figure 6:
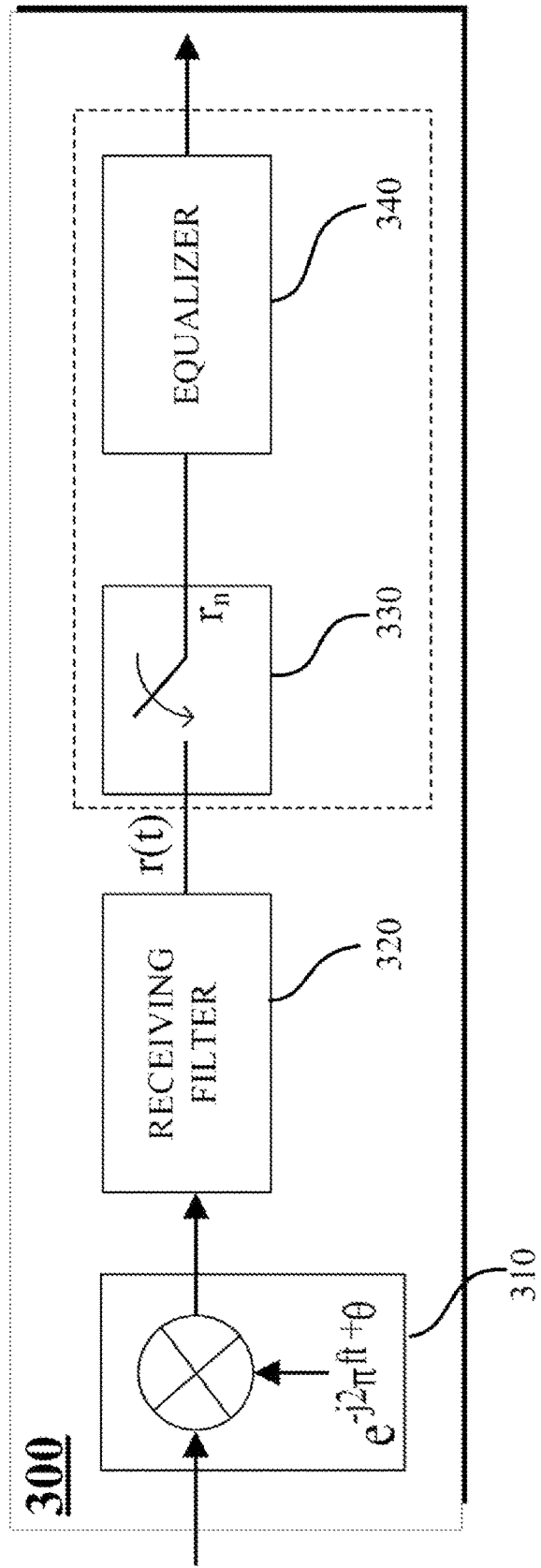
FIG. 6 is an example of a block diagram showing a configuration of a receiver 300 of a bus topology network.

FIG. 6 is an example of a block diagram showing a configuration of a receiver 300 of a bus topology network.

In a channel, a signal transmitted by a transmitter of a transmitting node is subjected to inter-symbol interference due to a characteristic according to a frequency, contaminated with white noise, and transferred to the receiver 300 of a receiving node.

Figure 8:
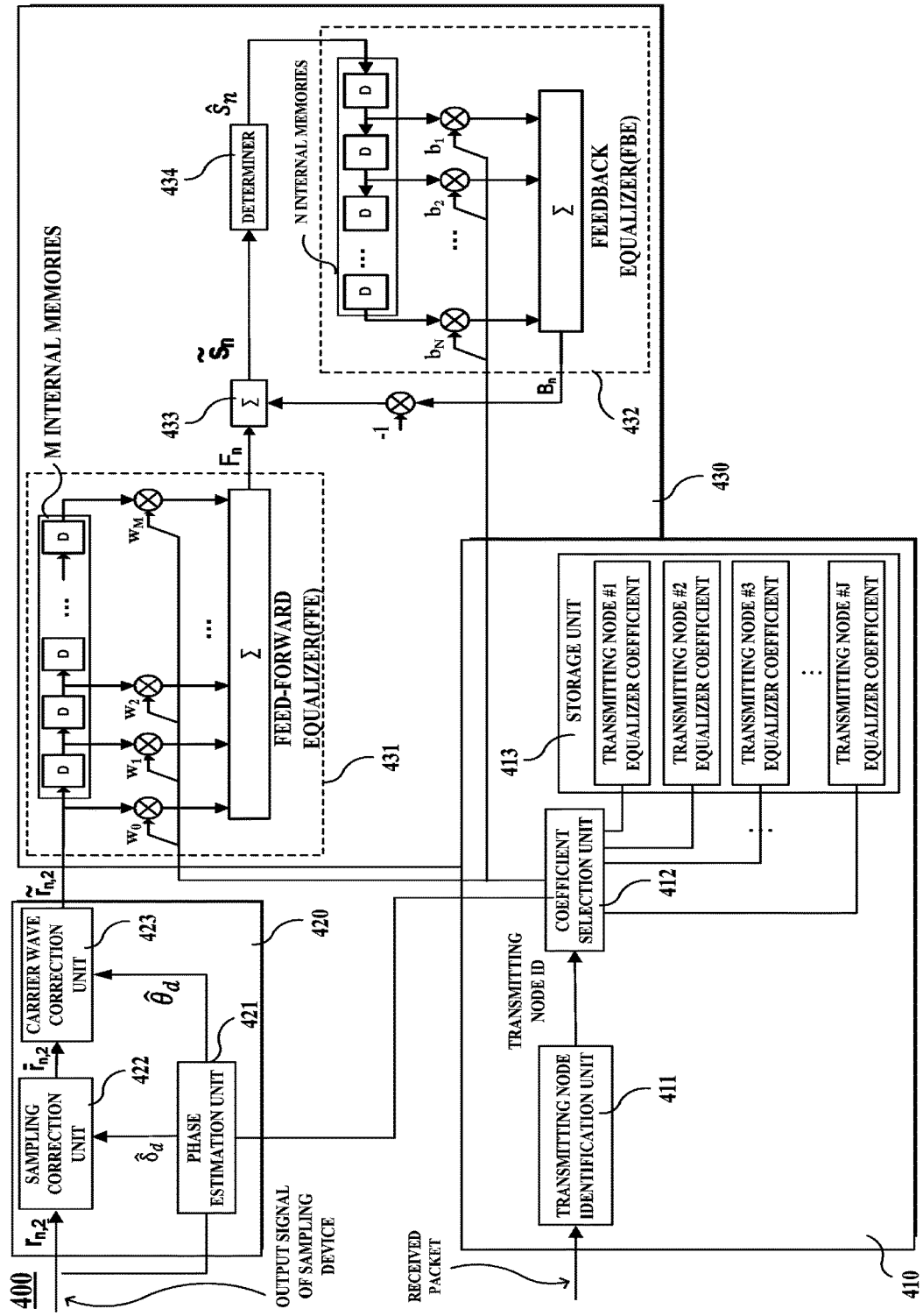
FIG. 8 is an example of a block diagram showing a configuration of an equalizer in a receiver of a bus topology network.

The receiver 300 converts the received signal into a baseband through a demodulator 310 in the case of passband modulation, passes the received signal through a receiving filter 320 as it is in the case of baseband conversion, and applies the signal to a sampling device 330. In the case of passband modulation, a modulator of the transmitter and the demodulator 310 of the receiver have an identical operating frequency f. However, since phase information of the transmitter is not known to the receiver, there is a carrier wave phase difference of θ. An equalizer is configured to equalize the output signal of the sampling device 330. FIG. 8 shows a configuration corresponding to an equalizer 340 of FIG. 6.

From now, it is assumed that a signal received by the receiver 300 is a passband signal. However, when a signal received by the receiver 300 is a baseband signal, no carrier wave is used, and there can be a sampling phase difference alone. In this case, the receiver 300 is required to correct only the sampling phase difference.

Figure 7:
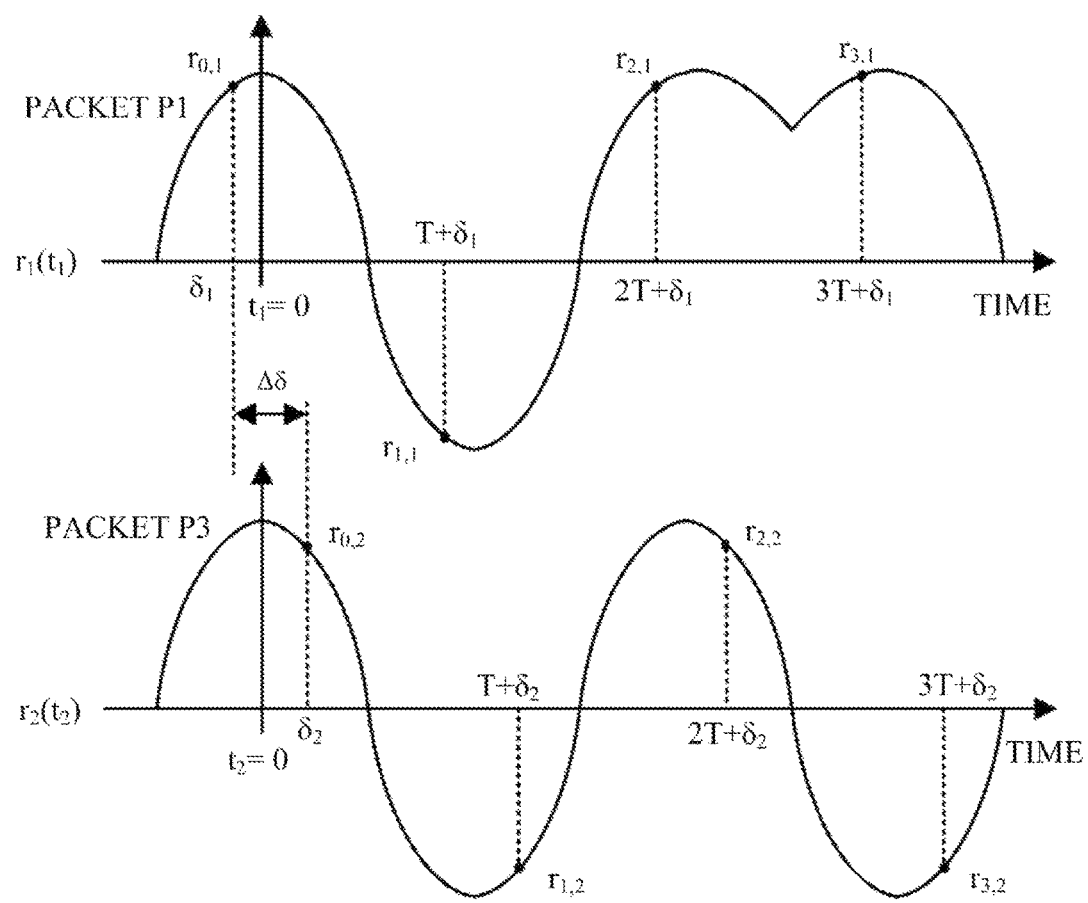
FIG. 7 is an example of graphs illustrating a process of a sampling device when a training packet P1 and a data packet P3 are received from the same transmitting node.

FIG. 7 is an example of graphs illustrating a process of a sampling device processing packets received from the same transmitting node.

FIG. 7 shows an analog signal sampling process in a sampling device of a receiver when the node B receives a first training sequence of the packet P1 and then receives a training sequence of the packet P3 in the packet transmission and reception process of FIG. 2. It is assumed that a received analog signal $r_1(t_1)$ of the packet P1 is sampled by the receiver with an offset of an arbitrary value $\delta_1$ on the basis of $t_1=0$ which is a peak point of a first training signal.

When a length of a symbol period of received data is T, the sampling device samples the received signal $r_1(t_1)$ in every symbol period and transfers the sampled signal to an equalizer. An output signal $r_{n,1}$ of the sampling device at a time $t=nT+\delta_1$ may be expressed by Equation 1 below.

$$r_{n,1} = r_1(nT + \delta_1), -\frac{T}{2} \leq \delta_1 \leq \frac{T}{2}, n = 0, 1, 2, \ldots \quad \text{[Equation 1]}$$

In FIG. 7, $\delta_1$ is a negative number. A first sample $r_{0,1}$ corresponding to n=0, a second sample $r_{1,1}$ corresponding to n=1, a third sample $r_{2,1}$ corresponding to n=2, and a fourth sample $r_{3,1}$ corresponding to n=3 are respectively sampled at $t_1=\delta_1$, $t_1=T+\delta_1$, $t_1=2T+\delta_1$, and $t_1=3T+\delta_1$ in sequence and transferred to the equalizer. In FIG. 7, it is assumed that first four bits of the training sequence transmitted in the packet P1 are +1, −1, +1 and +1. The equalizer of the receiver is trained using all of the four bits and the following training data, and the corresponding coefficient is stored in a memory of the equalizer.

Next, it is assumed that when an analog signal $r_2(t_2)$ of the training sequence of the packet P3 is input to the receiver as shown in FIG. 7, the receiver samples the analog signal $r_2(t_2)$ with an arbitrary sampling offset $\delta_2$ on the basis of $t_2=0$ which is a peak point of a first training signal of the packet P3 unlike the case of receiving the packet P1. It is assumed that first four bits of the training sequence of the packet P3 are +1, −1, +1 and −1. Here, a sampled discrete signal $r_{n,2}$ is expressed by Equation 2 below.

$$r_{n,2}=r_2(nT+\delta_2), -T/2 \le \delta_2 < T/2 \quad \text{[Equation 2]}$$

In FIG. 7, $\delta_2$ is assumed to be a positive number. Therefore, when the packet P1 and the packet P3 are received, an output of the sampling device may have a sampling phase difference $\delta_d$ obtained by subtracting $\delta_1$ from $\delta_2$ ($\delta_d=\delta_2-\delta_1$), and the receiving node does not previously know the sampling phase difference. $\delta_d$ is a value greater than −T and smaller than T.

Therefore, to use an equalizer coefficient for which training has been performed upon receiving the packet P1 as it is when receiving the packet P3 due to no change in the link between a time when receiving the packet P1 and a time when receiving the packet P3, it is necessary to transfer a discrete signal obtained by compensating for the sampling phase difference $\delta_d$ and sampling the packet P3 again as an input of the equalizer. In other words, it is necessary to sample the analog signal of the packet P3 using a delay value $\delta_1$ of the packet P1 and transfer the sampled signal to the equalizer. Further, there is a carrier wave phase difference of $\theta_d$ between the packet P1 and the packet P3, but the receiving node does not know the carrier wave phase difference either.

When the receiver accurately estimates and compensates for $\delta_d$ and $\theta_d$, it is possible to directly perform data receiving using the previous equalizer coefficient without additional equalizer training.

FIG. 8 is an example of a block diagram showing a configuration of an equalizer 400 in a receiver of a bus topology network. FIG. 8 shows a configuration corresponding to an equalizer 340 of FIG. 6.

The equalizer 400 of a bus topology network includes a coefficient extraction device 410 which stores an equalizer coefficient for at least one transmitting node and extracts an equalizer coefficient according to a source node of a received packet, and an equalizer 430 which equalizes an output signal of a sampling device using a stored equalizer coefficient. In addition, the equalizer 400 of a bus topology network may further include a phase corrector 420 which corrects a sampling phase difference and a carrier wave phase difference between an output of the equalizer and a training sequence included in a baseband signal using the training sequence for an output signal of the sampling device that samples the baseband signal in every symbol period.

First, when a data packet is received, the receiver interprets a preamble to check whether the data packet is intended to be transferred to the receiver. When receiver IDs are different, the receiver waits until a new packet is received. When the receiver IDs are identical and the received packet is a training packet, the receiver performs equalizer training. When the received packet is a data packet, the receiver calculates $\delta_d$ and $\theta_d$ using a second training sequence in the packet to correct a signal output from the sampling device 330, transfers the corrected signal to the equalizer, and proceeds to a step of receiving data.

When the received packet is a data packet and an equalizer coefficient for the corresponding transmitting node has been stored, the equalizer extracts an equalizer coefficient for the transmitting node of the packet from a storage unit 413 and stores the equalizer coefficient in each of internal memories of an FFE 431 and an FBE 432. It is assumed that the FFE 431 has M internal memories and the FBE 432 has N internal memories.

The equalizer 430 includes the FFE 431, the FBE 432, an adder 433, and a determiner 434.

Output signals of the sampling device are sequentially input to the M memories in the FFE 431. A current symbol value and previously received M signals are respectively multiplied by FFE coefficients $w_0, w_1, \ldots,$ and $w_M$, and the products are summed up by the adder to obtain an output $F_n$ of the FFE. The FBE 432 inputs a determination value $\hat{s}_n$ which has passed through the determiner 434 to the N memories therein, multiplies outputs of the memories respectively by FBE coefficients $b_1, b_2, \ldots,$ and $b_N$, and sums up the products through the adder to calculate an output $B_n$ of the FBE. An output of the overall equalizer is calculated by the adder 433 adding the output $F_n$ of the FFE and a negative value of the output $B_n$ of the FBE.

The coefficient extraction device 410 includes a storage unit 413 which stores equalizer coefficients for which training has been performed using training sequences included in packets received from transmitting nodes and IDs of the transmitting nodes, a transmitting node identification unit 411 which extracts a transmitting node ID from a received packet, and a coefficient selection unit 412 which selects an equalizer coefficient corresponding to the transmitting node ID in the storage unit.

A process of correcting a sampling phase difference and a carrier wave phase difference of an output signal of a sampling device will be described in detail below. The phase corrector 420 performs the process of correcting the sampling phase difference and the carrier wave phase difference.

The phase corrector 420 includes a phase estimation unit 421 which estimates a sampling phase difference and a carrier wave phase difference, a sampling correction unit 422 which corrects a sampling phase of an output signal on the basis of a sampling phase difference, and a carrier wave correction unit 423 which corrects a carrier wave phase of the signal whose sampling phase has been corrected on the basis of a carrier wave phase difference.

The sampling correction unit 422 receives an input discrete signal $r_{n,2}$ as an input and generates a discrete signal sequence $\bar{r}_{n,2}$ having an arbitrary time delay. In general, a timing conversion filter is widely used for sampling correction. A variety of methods of generating a discrete signal having an arbitrary time delay with a linear sum of an input signal are known, and all the methods can be used. The sample $\bar{r}_{n,2}$ whose sampling phase has been corrected is thereafter provided as an input of the carrier wave correction unit 423. When a phase rotation value is $\theta$, this device outputs a signal $\tilde{r}_{n,2}$ whose phase has been rotated by $\theta$ by multiplying the input by $e^{j\theta}$.

$\tilde{r}_{n,2}$ is provided as an equalizer input. An equalizer output $\tilde{s}_n$ obtained by subtracting the output $B_n$ of the FBE from the output $F_n$ of the FFE in the equalizer is expressed by Equation 3 below.

$$\tilde{s}_n = e^{j\theta} \sum_{k=0}^{M-1} w_k \bar{r}_{n-k,2}(\delta) - \sum_{k=1}^{N} b_k \hat{s}_{n-k} \quad \text{[Equation 3]}$$

$w_k$ is an FFE coefficient among equalizer coefficients, $b_k$ is an FBE coefficient among equalizer coefficients, and $\hat{s}_n$ is an output of the determiner 434 of the equalizer.

$w_k$ and $b_k$ are equalizer coefficients calculated using previous training packets. When K training sequences are transmitted in data packets, an overall error F of the equalizer output $\tilde{s}_n$ and training data $s_n$ is given by Equation 4 below.

$$\Gamma(\delta, \theta) = \sum_{n=1}^{K} \|s_n - \tilde{s}_n\|^2 = \qquad [\text{Equation 4}]$$

$$\sum_{n=1}^{K} \left\| s_n - e^{j\theta} \sum_{k=0}^{M-1} w_k \bar{r}_{n-k,2}(\delta) + \sum_{k=1}^{N} b_k \hat{s}_{n-k} \right\|^2$$

The phase estimation unit 421 of the phase corrector 420 calculates $\delta$ and $\theta$ for minimizing $\Gamma(\delta, \theta)$ of Equation 4. Values minimizing the error are referred to as an optimal sampling phase difference $\hat{\delta}_d$ and an optimal carrier wave phase difference $\hat{\theta}_d$. This process determines the parameters $\hat{\delta}_d$ and $\hat{\theta}_d$ so that the output of the equalizer becomes as much similar as possible to training data.

Assuming that the equalizer converges and the output of the determiner has no error, a substitution can be made as follows: $\hat{s}_{n-k} = s_{n-k}$, and when $b_0$ is defined to be equal to 1, $\Gamma(\delta, \theta)$ may be arranged as shown in Equation 5 below.

$$\Gamma(\delta, \theta) = \sum_{n=1}^{K} \left\| \sum_{k=0}^{N} b_k s_{n-k} - e^{j\theta} \sum_{k=0}^{M-1} w_k \bar{r}_{n-k,2}(\delta) \right\|^2 \qquad [\text{Equation 5}]$$

In the above equation, the first term $\Sigma_{k=0}^{N} b_k s_{n-k}$ is a fixed value irrelevant to $\delta$ and $\theta$ and thus indicates $\Phi_n$, and the second term may be defined using the following equation: $F_n(\delta) = \Sigma_{k=0}^{M-1} w_k \bar{r}_{n-k,2}$. Then, Equation 5 may be simplified as shown in Equation 6 below.

$$\Gamma(\delta, \theta) = \sum_{n=1}^{K} \|\Phi_n - e^{j\theta} F_n(\delta)\|^2 \qquad [\text{Equation 6}]$$

$e^{j\theta} F_n(\delta)$ is an output of the FFE when a delay value of a timing converter is set to $\delta$ and a carrier wave phase rotation value is set to $\theta$. Therefore, $\Phi_n$ may be previously calculated using a known training sequence, and FFE outputs may be calculated from all possible combinations of $\delta$ and $\theta$ to find $\delta$ and $\theta$ for minimizing the difference.

In brief, an optimal sampling phase difference and an optimal carrier wave phase difference which result in the minimum error of an equalizer output are selected from among a plurality of candidate sampling phase differences and a plurality of candidate carrier wave phase differences. Subsequently, a signal input to the equalizer (an output signal of the sampling device) is corrected so that the input signal of the equalizer may have an optimal sampling phase and an optimal carrier wave phase.

However, since $\theta$ may have a continuous arbitrary value between 0 and $2\pi$ and $\delta$ may have an arbitrary value between $-T$ and $T$, it is very difficult to calculate optimal estimated values for minimizing $\Gamma(\delta, \theta)$ from all values of $\delta$ and $\theta$.

Therefore, a more practical method involves calculating estimated values for minimizing $\Gamma(\delta, \theta)$ from a predetermined number of quantized values of $\delta$ and $\theta$. In other words, the complexity of calculation is lowered by quantizing candidate sampling phase differences and candidate carrier wave phase differences. This includes two steps. First, in a first step, $\tilde{\delta}$ and $\tilde{\theta}$ which are optimal quantized values are calculated, and in a second step, a more accurate value $\hat{\theta}$ is obtained through an additional calculation.

In the first step, values which result in the minimum error are found among quantized values of $\delta$ and $\theta$.

First, $$\theta_i = \frac{2\pi}{U} i$$

($i = 0, \ldots,$ and $U-1$) which is obtained by quantizing $\theta$ in U units of a predetermined angle between 0 degrees and $2\pi$ is used. When U has a large value, an error is calculated from a precise angle, and an accurate phase error value can be obtained, but there is a disadvantage of an increase in the complexity.

Quantized $$\delta_j = \left(\frac{j}{V} - \frac{1}{2}\right) T$$

($j = -V, \ldots,$ and $V-1$) is used as a sampling phase difference.

$$\Gamma\left(\frac{2\pi}{U} i, \left(\frac{j}{V} - \frac{1}{2}\right) T\right)$$

is calculated for a total of $U \times 2V$ combinations, and $\delta_j$ and $\theta_j$ for minimizing $$\Gamma\left(\frac{2\pi}{U} i, \left(\frac{j}{V} - \frac{1}{2}\right) T\right)$$

are calculated and expressed as $\tilde{\delta}$ and $\tilde{\theta}$. $\tilde{\delta}$ is determined as the aforementioned optimal sampling phase difference $\hat{\delta}_d$. The sampling correction unit 422 corrects the signal using $\hat{\delta}_d$ and then corrects a carrier wave phase difference more precisely in the second step.

In the second step, a more accurate carrier wave phase difference is calculated on the basis of the determined optimal sampling phase difference $\hat{\delta}_d$. A highly accurate carrier wave phase value is calculated because even a small carrier wave phase difference directly leads to an error when a high-order modulation scheme, such as 64 quadrature amplitude modulation (64QAM), 256QAM, or the like, is used. An improvement in the carrier wave phase difference involves calculating a residual carrier wave phase difference on the basis of the estimated value $\tilde{\theta}$ calculated in the first step.

To this end, the phase is expressed as follows: $\theta = \theta_r + \tilde{\theta}$. $\theta_r$ is a residual carrier wave phase difference to be estimated in the second step. Here, the equalizer output error $\Gamma(\delta, \theta)$ is arranged as shown in Equation 7 below.

$$\Gamma(\tilde{\delta}, \theta_r + \tilde{\theta}) = \sum_{n=1}^{K} \|\Phi_n - e^{j\theta_r} e^{j\tilde{\theta}} F_n(\tilde{\delta})\|^2 \qquad [\text{Equation 7}]$$

Since calculation of $\theta_r$ minimizing $\Gamma(\tilde{\delta}, \theta_r + \tilde{\theta})$ requires a very complex calculation process, a simpler method is proposed.

A simplified technique of calculating $\theta_r(n)$, which is a value of $\theta_r$ minimizing an error of each training symbol $s_n$, that is, $\|\Phi_n - e^{j\theta_r} e^{j\tilde{\theta}} F_n(\tilde{\delta})\|$, separately according to symbols and averaging $\theta_r(n)$ (n=1, ..., and K) without directly calculating a value minimizing $\Gamma(\tilde{\delta}, \theta_r+\tilde{\theta})$ is used.

Figure 9:
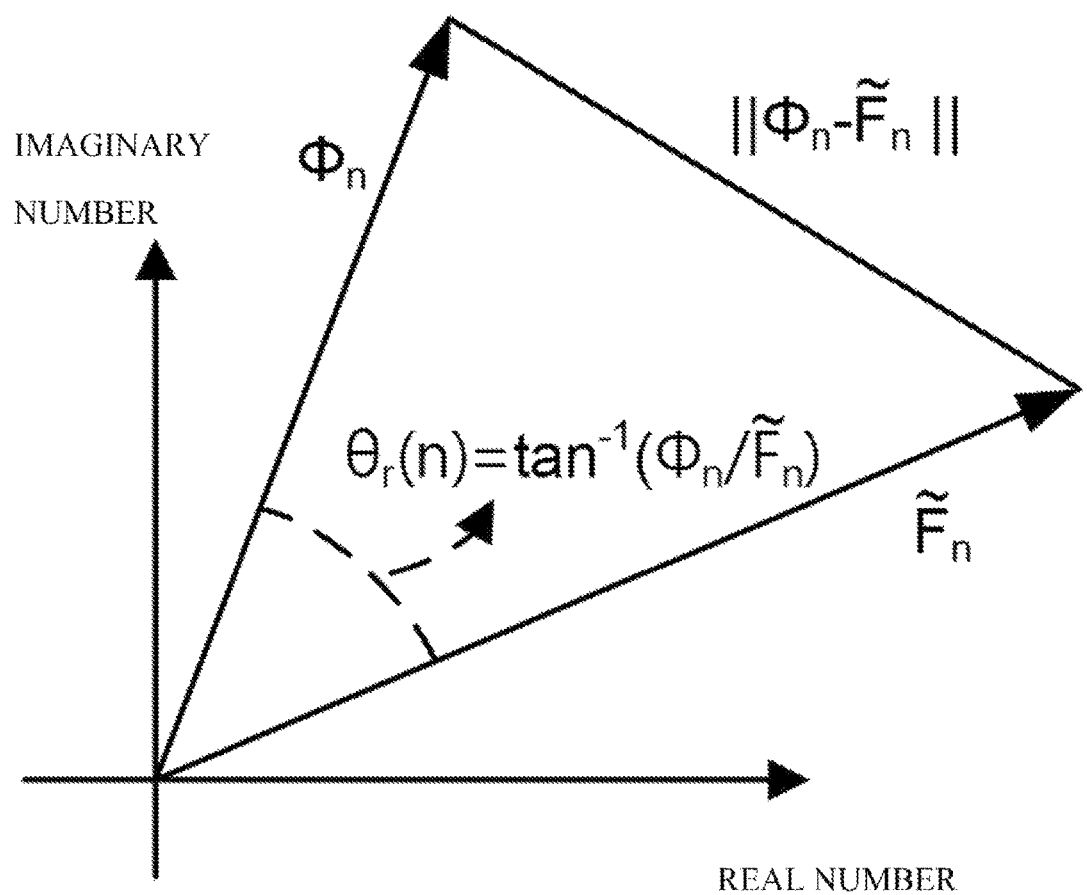
FIG. 9 is an example of the complex plane for calculating an optimal carrier wave phase.

When $\tilde{F}_n$ is defined as follows: $\tilde{F}_n=e^{j\tilde{\theta}}F_n(\tilde{\delta})$, it can be easily seen that it is optimal to set $\theta_r$ for minimizing the error between $\Phi_n$ and $\tilde{F}_n$ to an angle between $\Phi_n$ and $\tilde{F}_n$ in the complex plane. FIG. 9 is an example of the complex plane for calculating an optimal phase.

An estimated residual phase value $\hat{\theta}_r$ is calculated by averaging $\theta_r(n)$ (n=1, ..., and K) which are calculated for K training sequences as shown in Equation 8 below.

$$\hat{\theta}_r = \frac{1}{K}\sum_{n=1}^{K}\theta_r(n) \quad \text{[Equation 8]}$$

A final carrier wave phase difference $\hat{\theta}_d$ is $\hat{\theta}_r+\tilde{\theta}$. The carrier wave correction unit 423 rotates an output signal of the sampling correction unit 422 by the optimal carrier wave phase difference $\hat{\theta}_d$ in the complex plane and transfers the rotated output signal as an equalizer input. In this way, when the sampling phase difference and the carrier wave phase difference of the output signal of the sampling device are corrected and the output signal is transferred as an equalizer input, it is possible to directly start data receiving using a previous equalizer coefficient without additional equalizer training.

Meanwhile, after the packet is received, the receiver may calculate an SNR of the equalizer output $\tilde{s}_n$ using Equation 9 below.

$$SNR = \frac{\sum_{n=1}^{K}\|\tilde{s}_n\|^2}{\sum_{n=1}^{K}\|s_n - \tilde{s}_n\|^2} \quad \text{[Equation 9]}$$

Here, K is the number of training symbols for calculating the SNR. When the SNR value is greater than the reference value $SNR_{th}$, it is determined that the equalizer has converged, and when the SNR is smaller than $SNR_{th}$, it is determined that the equalizer has not converged, and a message is transmitted to the transmitting node to request equalizer training again.

The present embodiment and the attached drawings are merely illustrative to describe a part of the technical spirit included in the above-described technology. Therefore, it is apparent that modifications and specific embodiments which those of ordinary skill in the art can easily infer within the scope of the technical spirit included in the specification and drawings of the above-described technology fall within the technical scope of the above-described technology.

The invention claimed is:

1. A method of equalizing received packet data in a bus network connecting a plurality of nodes, the method comprising:
   receiving, by a receiver of a receiving node of the plurality of nodes in the bus network, a first packet from a transmitting node of the plurality of nodes;
   storing, by the receiver, an equalizer coefficient of an equalizer for the transmitting node using a first training sequence of the first packet;
   receiving, by the receiver, a second packet including a second training sequence shorter than the first training sequence from the transmitting node;
   identifying, by the receiver, the transmitting node using an identification information in the second packet;
   setting, by the receiver, the equalizer with the equalizer coefficient which is selected based on the identification information;
   updating, by the receiver, the equalizer coefficient of the equalizer or correcting an input signal to the equalizer based on a difference of a signal characteristic between the first training sequence and the second training sequence; and
   equalizing, by the receiver, the second packet using the equalizer.

2. The method of claim 1, wherein the updating the equalizer coefficient comprises determining, by the receiver, at least one of a sampling phase difference and a carrier wave phase difference between the first training sequence and the second training sequence, changing the equalizer coefficient based on the determined at least one of the sampling phase difference and the carrier wave phase difference, and equalizing the second packet.

3. The method of claim 1, wherein the correcting the input signal to the equalizer being based on at least one of a sampling phase difference and a carrier wave phase difference between the first training sequence and the second training sequence.

4. The method of claim 1, wherein the correcting the input signal to the equalizer comprises determining an optimal sampling phase difference and an optimal carrier wave phase difference for minimizing an error of an output of the equalizer among a plurality of quantized candidate sampling phase differences and carrier wave phase differences, firstly correcting the input signal based on the optimal sampling phase difference and the optimal carrier wave phase difference, determining a carrier wave phase difference value for minimizing an error between the output of the equalizer per each training symbol, determining a final optimal carrier wave phase difference by adding an average of carrier wave phase differences of all symbols to the determined optimal carrier wave phase difference, and secondarily correcting a phase of the corrected input signal based on the final optimal carrier wave phase difference.

5. The method of claim 4, wherein the optimal carrier wave phase difference represented by $\theta$ and the optimal sampling phase difference represented by $\delta$ are determined to be values for minimizing an equation $\Gamma(\delta, \theta)$ below:

$$\Gamma(\delta, \theta) = \sum_{n=1}^{K}\|s_n - \tilde{s}_n\|^2 = \sum_{n=1}^{K}\left\|s_n - e^{j\theta}\sum_{k=0}^{M-1}w_k\tilde{r}_{n-k,2}(\delta) + \sum_{k=1}^{N}b_k\hat{s}_{n-k}\right\|^2$$

where K is a number of second training sequences, $\tilde{s}_n$ is the equalizer output, $s_n$ is the second training sequence, $w_k$ is a feed-forward equalizer (FFE) coefficient among equalizer coefficients, $b_k$ is a feedback equalizer (FBE) coefficient among the equalizer coefficients, and $\tilde{r}_n$ is a signal output from a sampling device.

6. The method of claim 1, wherein the first packet includes a first identification information of the first training sequence for setting the equalizer coefficient, and
   the second packet includes a second identification information of the previous equalizer coefficient for the transmitting node.

* * * * *